S. B. NEWBERRY.
PROCESS OF RECOVERING ALKALIS FROM FLUE GASES.
APPLICATION FILED OCT. 5, 1911.
1,121,532.    Patented Dec. 15, 1914.
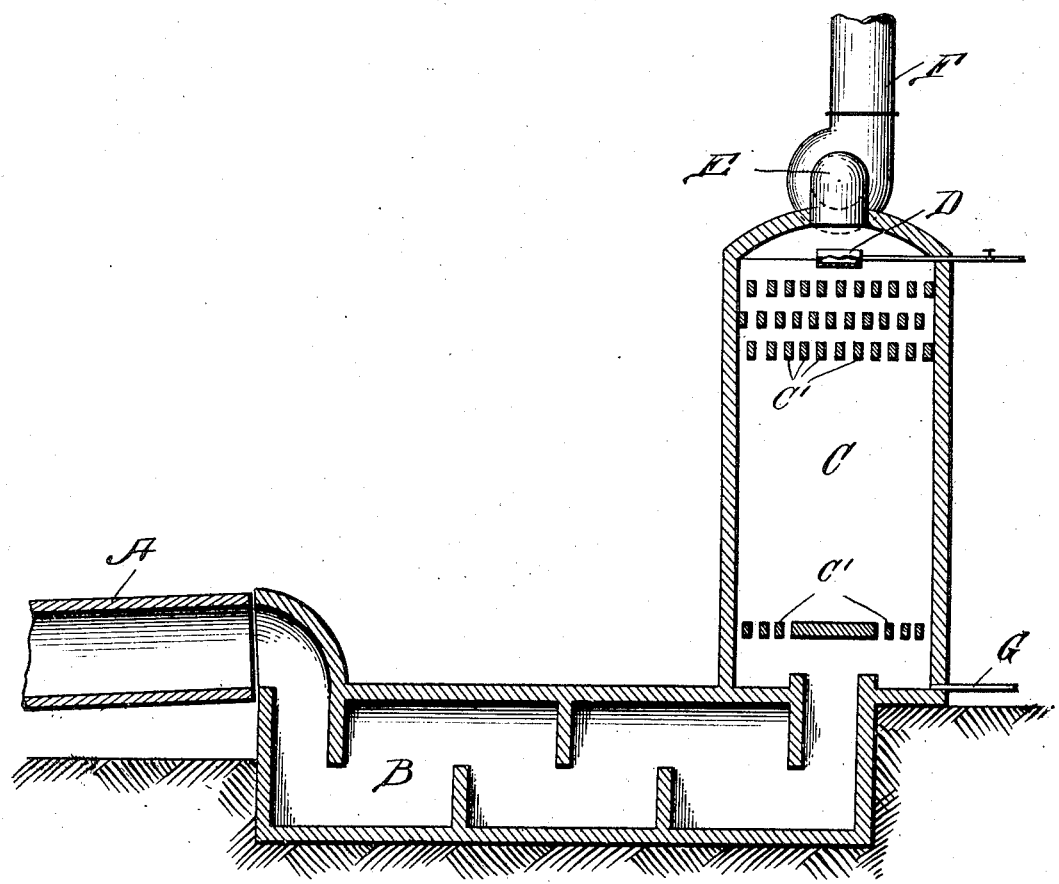

UNITED STATES PATENT OFFICE.

SPENCER B. NEWBERRY, OF BAYBRIDGE, OHIO, ASSIGNOR OF ONE-HALF TO JOHN R. MORRON, OF NEW YORK, N. Y.

PROCESS OF RECOVERING ALKALIS FROM FUEL-GASES.

1,121,532.          Specification of Letters Patent.        Patented Dec. 15, 1914.

Application filed October 5, 1911. Serial No. 653,072.

*To all whom it may concern:*

Be it known that I, SPENCER B. NEWBERRY, a citizen of the United States, and resident of Baybridge, in the county of Erie and State of Ohio, have invented certain new and useful Improvements in Processes of Recovering Alkalis from Flue-Gases, of which the following is a specification.

It is well known that the raw mixture which is calcined to form Portland cement clinker contains an appreciable percentage of alkalis, of which potash forms a considerable part. In many cases the proportion of potash in the mixed raw material exceeds one per cent. My experiments have shown that the clinker resulting from the calcination of such raw mixture contains a much smaller percentage of alkalis than that calculated from the raw mixture, the balance having been volatilized during the calcination, in part lost with the escaping flue-gases and in part deposited as an ingredient of the dust which collects in the flues of the kilns. Careful analyses have shown that the potash is much more completely volatilized than the soda.

I have found that in the ordinary process of making cement clinker, by burning the usual raw mixtures of limestone or marl and clay or shale, the alkalis contained in the flue dust are for the most part in a form insoluble in water and therefore incapable of being recovered in the form of an aqueous solution of alkali-metal salts according to the process hereinafter set forth. A considerable proportion of the alkali of certain raw materials is, however, given off in water-soluble form, and is capable of recovery by the herein-described process.

It is to be understood that the process of recovery of alkalis herein described is intended to apply to the recovery of the water-soluble portion of the alkalis contained in the flue-gases of cement or other kilns, whether these result from the burning of ordinary cement mixtures or from burning mixtures of special composition designed to yield an increased amount of alkali-metal salts in water-soluble form.

I accomplish the recovery of water-soluble alkali-metal salts from the flue dust and flue gases of cement kilns by dissolving and absorbing the said salts in water. This may be accomplished in several ways; for example, the gases may be caused to circulate over or through water contained in pans or reservoirs, in which the solution of alkali-metal salts is produced and constantly increased in strength by continued absorption of salts from the gases, aided by the evaporation of water by the heat of the gases, until the solution becomes of such strength that the salts to be recovered may be crystallized out on cooling, the mother-liquor from the crystallization, together with fresh water, being returned to the absorbing vessels. Or, a solution of alkali-metal salts is obtained by leaching the flue-dust, and this solution strengthened and concentrated by exposure to the hot flue gases. The most practical and economical method of accomplishing the absorption by water is, however, to cause the gases to meet a stream of water moving in a direction contrary to that of the gases, and in this manner to extract practically all the water-soluble salts from the gases, and at the same time to concentrate the resulting solution by evaporation to the point of crystallization or even to complete dryness. This I bring about by causing the gases to pass upward through a tower filled with an open checker-work of brick, at the top of which a spray of water is introduced. The flow is so adjusted that most of the water shall be evaporated in its descent over the extensive brick-work surface in contact with the gases, and a small stream only of concentrated solution of salts is continually discharged at the bottom of the tower.

It is, of course, to be understood that instead of water a solution of alkali-metal salts obtained by leaching flue-dust with water may be employed for absorbing the salts from the flue-gases, as described.

As a practical example of the working of my process, I disclose in the accompanying drawing apparatus for the purpose, which is to be considered as illustrative only and may be modified in details as desired.

Referring to the drawing cement raw mixture is burned in a revolving kiln A in the usual manner, the gases are passed through brickwork flues or chambers B provided with well known appliances, such as transverse or longitudinal walls for the purpose of arresting dust, and then the partially purified gases are drawn, by means of a pan E or by the draft of a stack F, through a vertical tower C filled with an open checker-work of brick C', at the top of which water or alkali-metal salt solution is distributed in a sub-divided stream by means of the spray nozzle D. The entering water is so regulated that in its passage downward over the multiple surfaces of the checker-work it is for the most part evaporated by the heat of the gases, and the resulting solution increased in strength by fresh addition of alkali-metal salts, so that at the base of the tower a comparatively small amount of a very concentrated solution of salts is obtained. This is drawn off through the pipe G into pans and allowed to cool, and in this operation deposits in solid form a large part of the alkali-metal salts contained. The mother-liquor is then added to the water or solution introduced at the top of the tower.

What I claim is:

The process of recovering alkalis, from the flue-gases of cement kilns, which consists in leaching flue-dust with water, causing the solution so obtained to move over an extended surface in contact with a current of flue gases and in a direction contrary to that of the gases, in such manner that the solution shall be concentrated by absorption of salts from the gases and by evaporation by the heat of the gases to the point of crystallization, cooling the concentrated solution, separating deposited salts, and returning the mother-liquor to contact with the gases.

In testimony whereof I affix my signature in presence of two witnesses.

SPENCER B. NEWBERRY.

Witnesses:
JACOB KRAFTY,
IRVIN H. NUBER.